(12) United States Patent
Stokes et al.

(10) Patent No.: US 7,265,684 B2
(45) Date of Patent: Sep. 4, 2007

(54) ONBOARD EQUIPMENT FOR AIRCRAFT AND THE LIKE

(75) Inventors: Peter David Stokes, Dereham (GB); Dan Leach, Buckden (GB)

(73) Assignee: Saf-T-Glo Limited, Narborough (GB)

( * ) Notice: Subject to any disclaimer, the term of this patent is extended or adjusted under 35 U.S.C. 154(b) by 58 days.

(21) Appl. No.: 10/945,360

(22) Filed: Sep. 20, 2004

(65) Prior Publication Data
US 2005/0104740 A1 May 19, 2005

(30) Foreign Application Priority Data
Sep. 19, 2003 (GB) ................. 0321959.9
Dec. 11, 2003 (GB) ................. 0328696.0

(51) Int. Cl.
*G08B 21/00* (2006.01)
(52) U.S. Cl. .................. 340/945; 340/286.05; 362/471
(58) Field of Classification Search ................. 340/945
See application file for complete search history.

(56) References Cited

U.S. PATENT DOCUMENTS

| | | | |
|---|---|---|---|
| 3,787,867 A | 1/1974 | Dodge et al. | |
| 3,894,389 A | 7/1975 | Miura et al. | |
| 4,097,782 A * | 6/1978 | Chambliss | 315/209 R |
| 4,292,570 A * | 9/1981 | Engel | 315/360 |
| 4,342,947 A * | 8/1982 | Bloyd | 315/199 |
| 4,347,499 A * | 8/1982 | Burkman et al. | 340/815.69 |
| 5,254,971 A * | 10/1993 | Sutterlin et al. | 340/458 |
| 5,313,188 A | 5/1994 | Choi et al. | |
| 5,428,912 A * | 7/1995 | Grondal et al. | 40/570 |
| 5,585,699 A * | 12/1996 | Schulz | 315/293 |
| 5,812,422 A * | 9/1998 | Lyons | 703/18 |
| 5,815,068 A * | 9/1998 | Vadseth | 340/332 |
| 6,174,073 B1 | 1/2001 | Regan et al. | |
| 6,292,718 B2 * | 9/2001 | Staiger | 701/1 |
| 6,396,408 B2 * | 5/2002 | Drummond et al. | 340/815.4 |
| 6,548,967 B1 * | 4/2003 | Dowling et al. | 315/318 |
| 6,570,505 B1 * | 5/2003 | Malenfant | 340/641 |
| 6,703,788 B1 * | 3/2004 | Miller et al. | 340/870.11 |
| 6,741,638 B2 * | 5/2004 | Ramberg et al. | 375/150 |
| 6,754,602 B1 * | 6/2004 | Tkachenko et al. | 702/108 |
| 2002/0163316 A1 | 11/2002 | Lys et al. | |
| 2004/0051467 A1 * | 3/2004 | Balasubramaniam et al. | 315/149 |
| 2004/0198466 A1 * | 10/2004 | Walby et al. | 455/574 |
| 2005/0052339 A1 * | 3/2005 | Sprague | 345/1.1 |
| 2005/0202785 A1 * | 9/2005 | Meyer | 455/66.1 |

FOREIGN PATENT DOCUMENTS

| | | |
|---|---|---|
| EP | 1 641 325 A2 | 3/2006 |
| GB | 2 336 258 A | 10/1999 |
| WO | WO 2004/008261 | 1/2004 |

* cited by examiner

*Primary Examiner*—Benjamin C. Lee
*Assistant Examiner*—Eric M. Blount
(74) *Attorney, Agent, or Firm*—Greer, Burns & Crain, Ltd

(57) ABSTRACT

An emergency lighting system for an aircraft comprises networked light units that communicate wirelessly with a master controller to switch the light units on in an emergency. Each unit has its own battery power source and is arranged conserve power consumption by cycling between an operable (awake) condition in which it can communicate with the master controller and an inoperable (sleep) condition wherein the wake-up time is approximately 1 millisecond or less. Power consumption is also reduced by employing LEDs as the light source and pulsing the LEDs with a variable load factor to adjust the illumination level.

10 Claims, 5 Drawing Sheets

ONBOARD EQUIPMENT FOR AIRCRAFT AND THE LIKE

FIELD OF THE INVENTION

This invention concerns improvements in or relating to onboard equipment for aircraft and the like. The invention has particular, but not exclusive application to powered units employed for a variety of purposes, especially battery powered units such as may be used for lighting.

BACKGROUND OF THE INVENTION

In our co-pending International patent application published under No. WO 2004008261 we describe a wireless communication system employing spread spectrum communication for controlling operation of networked communication devices such as battery powered light units for an emergency lighting system to assist evacuation of the aircraft in an emergency.

In our aforesaid application, the devices communicate wirelessly with a master controller and are arranged to cycle between an operable (awake) condition in which they can respond directly or indirectly to a signal transmitted by the master controller and an inoperable (sleep) condition in which they cannot respond to such a signal.

By arranging the devices to re-transmit any broadcast signal, not all the devices have to be within range of the master controller and synchronisation of the wake/sleep cycle of the devices is not required. As a result, battery power is conserved and the effective life of the battery can be usefully extended without significantly affecting the overall response of the system to a signal transmitted by the master controller.

In the application to networked devices for emergency lighting, each light unit preferably employs light emitting diodes (LEDs). Typically an array of LEDs is employed requiring a low power consumption whereby the level and duration of light output can be achieved to comply with regulatory requirements using a small battery.

The present invention seeks to develop and provide further improvements in and relating to onboard equipment employed in aircraft and the like especially wireless communication devices of the type described in our aforesaid International patent application.

SUMMARY

Thus, according to one aspect of the present invention, we provide a system for a vehicle such as an aircraft comprising a plurality of networked communication devices arranged to communicate wirelessly with a master controller wherein each device is arranged to cycle between an operable (awake) condition and an inoperable (sleep) condition in which the wake-up time is approximately 1 millisecond or less, preferably 0.5 millisecond or less.

According to another aspect of the present invention, we provide a system for a vehicle such as an aircraft comprising a plurality of networked communication devices arranged to communicate wirelessly with a master controller wherein a multi-code generator is employed providing multiple switched outputs and spacing the switched outputs in the code space such that a search time for each device to detect a broadcast signal is reduced.

By reducing the wake-up time and the search time, battery life can be increased. For example, we may be able to achieve a battery life of eight to ten years. This may only require 1 test per week with a verification (checking) time of 6 seconds and power consumption of 1.4 Ah employing a lithium sulphur dioxide battery of type G36 'AA' (ex SAFT). It will be understood, however, that we may be able to achieve a battery life of eight to ten years with more regular testing, for example once per day, under appropriate test conditions, for example shorter duration and/or reduced power consumption.

Preferably, the switched outputs are spaced approximately equally in the code space. Preferably the devices communicate with the master controller using spread spectrum communication centred on a single frequency.

According to yet another aspect of the present invention, we provide a system for a vehicle such as an aircraft comprising a plurality of networked communication devices arranged to communicate wirelessly with a master controller wherein one or more devices is operable to provide a self-test check.

Each device may include one or more of a battery life check, light source check and circuit integrity check. For example where each device is a light unit employing LEDs as the light source, the light source check may be used to determine the number of LEDs that are working and provide a signal to the master controller to indicate that the unit is operational. The number of operational LEDs may be tested using a sub millisecond pulse, measuring the total current, and comparing this with a current for a permitted minimum number of operational LEDs.

Preferably the devices communicate with the master controller using spread spectrum communication centred on a single frequency.

According to still another aspect of the present invention, we provide a system for a vehicle such as an aircraft comprising a plurality of networked communication devices arranged to communicate wirelessly with a master controller wherein one or more devices is provided with a light source comprising an LED flat panel diffuser.

By employing a flat panel diffuser a uniform distribution of light is achieved in a slim (low-profile), space saving unit that can be used in a variety of applications to provide a desired illumination level. For example, the units can be used to illuminate door exit signs or as downlights for normal cabin illumination. Moreover, solid state components can be employed in place of traditional light sources such incandescent bulbs or the like that require replacement at regular intervals.

Yet another advantage of the flat panel diffuser is that a uniform light distribution is still provided if some of the LEDs are inoperable unlike an array of LEDs where failed LEDs produce a black spot. As a result, the unit can continue to operate and provide a satisfactory illumination even if the illumination level is slightly reduced due to some of the LEDs being inoperable.

Preferably the devices communicate with the master controller using spread spectrum communication centred on a single frequency.

According to yet another aspect of the present invention, we provide a system for a vehicle such as an aircraft comprising a plurality of networked communication devices arranged to communicate wirelessly with a master controller wherein one or more devices is provided with an infra-red data (IRDA) interface for local communication with the device.

The IRDA interface allows local interrogation of individual units if a fault is found. Alternatively or additionally, the IRDA interface may allow local programming of the device. For example, the location of the device and the type of device.

Preferably, the IRDA interface comprises a light guide providing access from the front of the device, for example a transparent tube capable of passing infra-red signals back and forth to control means, for example a microprocessor, controlling the operation of the device.

Preferably the devices communicate with the master controller using spread spectrum communication centred on a single frequency.

According to a still further aspect of the present invention, we provide a system for a vehicle such as an aircraft comprising a plurality of networked communication devices arranged to communicate wirelessly with a master controller wherein one or more devices is provided with a light source comprising at least one LED wherein, in use, power consumption is reduced by pulsing said at least one LED.

Preferably, said at least one LED is pulsed at a frequency so that no pulsing is visible to the human eye. For example, we may employ a pulsing frequency of 100 Hz.

Where the light source is employed as part of an emergency lighting system to indicate an escape route to the exit(s) of an aircraft, the current regulations require the system provide illumination for a minimum period of 10 minutes in an emergency. However, many aircraft operators specify a longer minimum period, typically 20 minutes, so as to provide a safety margin to ensure the system will meet the minimum requirements at the time of use. In some cases, even longer periods of illumination in an emergency such as in the ETOPS extended flight over water scenario may be desirable.

Each device employs a battery to power the light source which requires the battery to have a minimum residual battery life sufficient to provide the necessary power for this period of illumination. Accordingly, extending the battery life by reducing power consumption through pulsing an LED light source may contribute to a reduction in system costs without compromising safety. In addition, the system may be capable of more than one "switch-on" without replacing the batteries such that the operational capability of the system is not compromised after an inadvertent "switch-on".

According to a preferred feature of the invention we may employ pulsing of the light source with a variable load factor. The measured average illumination level is proportional to the load factor of the pulse and varying the load factor enables the light source to be effectively dimmed to produce a saving in power consumption and further extend battery life.

Thus, we may employ a variety of load factors between 10 and 100% of ON time according to the requirements of the system. The resulting savings in battery life are also proportional and an ON time operation for 45 minutes at a pulsed load of 10% is approximately equivalent to a standard ON time operation for 5 minutes full load.

The ability to dim the illumination has particular benefits when the system is employed to provide emergency lighting. Thus, we may operate the light source at full brightness for an initial period after switching on and then gradually reduce the brightness to a pre-determined minimum. In this way, the operation of the system can be matched to meet the ability of the human eye to dark adapt over time to a reduction in the level of illumination. As a result, power consumption is reduced at the time of use allowing the period of illumination to be increased providing additional safety margins, especially in the ETOPS scenario, while still meeting current rules and regulations.

Thus, according to yet another aspect of the present invention, we provide a system for a vehicle such as an aircraft comprising a plurality of networked communication devices arranged to communicate wirelessly with a master controller wherein one or more devices is provided with a light source comprising at least one LED wherein, in use, said at least one LED is capable of providing a variable illumination level.

Preferably, the level of illumination is controlled by pulsing the at least one LED with a variable load factor. For example, we may vary the load factor from 10 to 100% ON time while pulsing the LED at a frequency that is not visible to the human eye, for example 100 Hz, by means of an appropriate logic signal in the control system. In this way, the level of illumination can be varied according to requirements and power consumption can be reduced to provide extended illumination. Thus, when providing emergency lighting, we may gradually reduce the illumination level to match the dark adaptation of the human eye to lower illumination levels without compromising safety.

In the above-described aspects of the invention, each device may have a light source comprising one or more LEDs which may be white LEDs and/or coloured LEDs. A plurality of LEDs may be arranged in an array or take the form of flat panel diffuser as described previously.

Various aspects of the invention will now be described in more detail by way of example only with reference to the accompanying drawings.

DETAILED DESCRIPTION OF THE EXEMPLARY EMBODIMENTS

In the following description, features of the wireless lighting system of our co-pending International patent application published under No. WO 2004008261 are described with reference to FIGS. 1 and 2 followed by a description of embodiments of the present invention with reference to FIGS. 3 to 8. The reader is directed to our co-pending International patent application for further details and understanding of the wireless lighting system described therein and the contents of said application are incorporated herein by reference.

Figure 1:
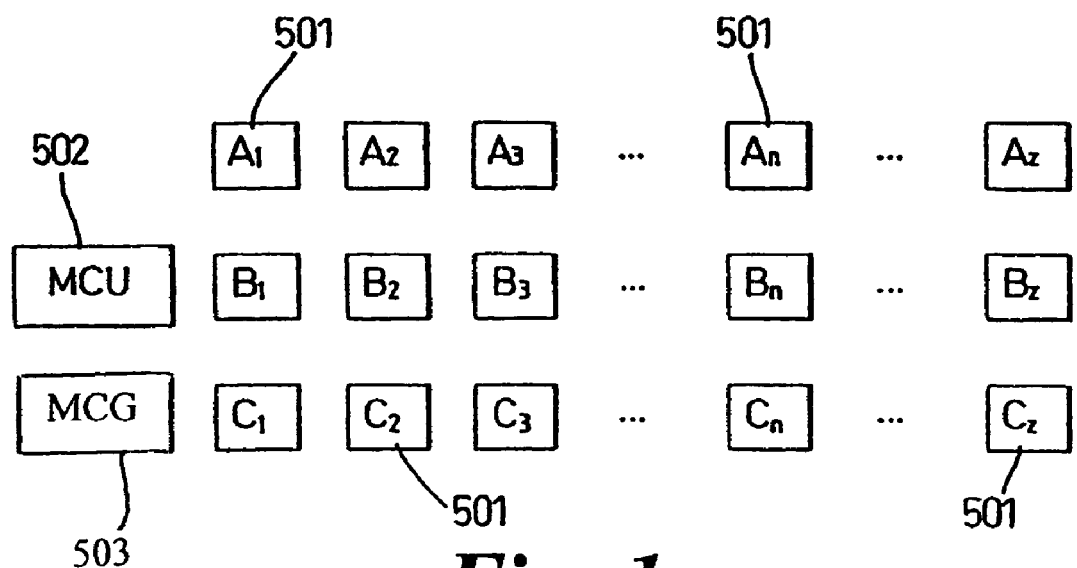
FIG. 1 is a schematic lay-out of the lighting system described in WO 2004008261.
Figure 2:
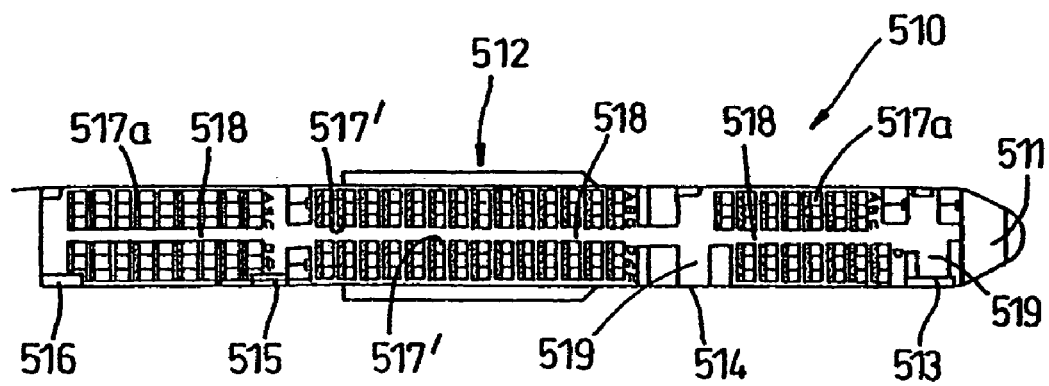
FIG. 2 shows a schematic of the interior of an aircraft to which the lighting system of FIG. 1 may be applied.

Referring first to FIGS. 1 and 2, there is depicted schematically a wireless lighting system 500 employing spread spectrum communication between a plurality of battery operated light units 501 arranged at an array of locations $A_1 \ldots A_z, B_1 \ldots B_z, C_1 \ldots C_z \ldots$ for control by a master control unit 502 for use in an aircraft 510 to assist escape in an emergency. While the array of locations is shown in FIG. 1 as a rectangular array, it will be appreciated that the actual array to be used will be governed largely by the geometry of the installation site and any applicable regulations.

The aircraft 510 has a cockpit 511 and a passenger cabin 512. The cabin 512 has a plurality of seats 517 arranged in rows on either side of a central main aisle 518. Branch aisles 519 lead from the main aisle 518 to exits 513, 514, 515 and 516. In this embodiment, there are four exits 513, 514, 515 and 516 from the cabin 512. Exits 513, 516 at the front and rear of the aircraft allow passengers to get on and off the aircraft 510 in normal use and in an emergency. Exits 514, 515 are provided for use in an emergency only. It will be understood that the number and lay-out of the seats 517, aisles 518, 519 and exits 513, 514, 515 and 516 maybe altered from that shown.

The light units 501 may be arranged at desired locations in the cabin 512 and the master control unit 502 arranged in the cockpit 511 for operation by the flight crew. For example, locations $A_1 \ldots A_z$, may be at the exits 513, 514, 515, 516 where the light units 501 are vertical exit identifiers (VEI's). Locations $B_1 \ldots B_z$ may be on aisle seats 517' where the light units 501 are mounted at or near floor level on one or both sides of the aisle 518 to provide a floor proximity lighting system to identify a route to the exits 513, 514, 515, 516 in an emergency. Locations $C_1 \ldots C_z$ may be on overhead luggage compartments (not shown) where the light units 501 are mounted above the seats 517 to provide overhead lighting in an emergency. It will be understood, however, that the light units 501 may be arranged at other locations in the aircraft 510 as desired.

While a single master control unit 502 is shown, a second such unit may be provided to allow operation of the light units 501 from more than one location if required. For example, a (primary) master control unit 502 may be provided in the cockpit 511 with an optional (secondary) master control unit 502 located at the rear of the aircraft 510 for operation by cabin staff. Additional (secondary) master control units 502 may be provided at other positions within the aircraft 510 if desired, for example adjacent to exits 513, 514, 515, 516.

The additional (secondary) units may be activated automatically in response to activation of the main (primary) master control unit 502. Alternatively, the main (primary) and additional (secondary) control units may be arranged so that each unit is activated automatically in response to activation of any one of the units. Alternatively or additionally, the additional (secondary) units may be activated manually, for example by switches.

In a modification, the (primary) master control unit 502 may be located in the cabin 512 at the front of the aircraft 510 and connected to a switch (not shown) in the cockpit 511. In this way, shielding of signals transmitted to and from the (primary) master control unit 502 by the bulkhead separating the cabin 512 from the cockpit 511 may be avoided. The master control unit 502 may include a master switch on a membrane panel to over-ride the cockpit switch.

This arrangement is suitable for both new build and retrofit installation of the emergency lighting system 500 in aircraft. Thus, when replacing an existing hard wired system, the (primary) master control unit 502 may be connected to an existing switch in the cockpit 511 for operating the original emergency lighting system. The light units 501 may be installed in place of the existing emergency lights. Alternatively, the light units 501 may be modified for connection to the existing emergency lights, for example by replacing a light source within the light units 501 with a connector for coupling to an existing light.

In this way, a hard wired emergency lighting system can be replaced with a wireless system during a re-fit with minimum disruption to the layout of the existing emergency lighting system. Thus, each light source of the existing emergency lighting system (both internal and external) may be connected to a modified light unit 501 permitting wireless control via a master control unit 502.

In use, the light units 501 are switched on and off in response to appropriate on and off signals broadcast from the master control unit 502. Alternatively, the light units 501 may be switched off automatically a pre-determined time after being switched on in the absence of an on-signal broadcast from the master control unit 502.

Each light unit 501 is arranged to cycle between a state in which it is "asleep" and does not respond to signals broadcast from the master control unit 502 and a state in which it is "awake" and capable of listening for and responding to a signal broadcast from the master control unit. Each light unit 501 receives and re-transmits any broadcast signal from the master control unit 502 or from another light unit when they are awake.

In this way, not all of the light units 501 have to be within range of the master control unit 502 as units 501 that are outside the range of the master control unit 502 will eventually receive the retransmitted signal from one of the other units 501. As a result, a low power spread spectrum signal having a limited range can be used and transmitted in cascade manner throughout an aircraft to reach a light unit at each of the array of locations. Consequently, the risk of interference with other onboard systems and equipment and/or any external communication systems is reduced or eliminated.

Also, not all the light units 501 have to be "awake" at the same time in order to receive/transmit a broadcast signal and the light units 501 can be arranged to be "awake" for very short periods of time, for example a few milliseconds, and to be "asleep" for longer periods of time, for example several seconds. In this way, battery power can be conserved without significantly increasing the overall response time of the system to a broadcast signal.

In accordance with a preferred embodiment of the present invention, power consumption may be further reduced and thereby extend battery life by one or more of the following modifications to the unit 501. For example, we may reduce the wake-up time of the light units 501 to less than 1 millisecond (ms), say 0.5 ms or less. We may employ a multi-code generator MCG 503 that provides multiple switched outputs to a despread mixer for the broadcast signal from the master control unit 502 and spacing the switched outputs approximately equally in the code space. This reduces the search time for each light unit 501 by a factor of "n" where "n" is the number of switched outputs generated.

These modifications further reduce the power consumption so that the potential battery life can be increased compared to the operation of the system described in our International patent application. For example, we believe that we can achieve a battery life of 8–10 years on 1.4 Ah and 6 seconds of verification (checking) per day using the lithium batteries above-described as a result of these changes to reduce power consumption. It will be understood that we may also achieve this with other types of batteries and we do not intend to be limited to lithium batteries.

In accordance with another preferred embodiment of the present invention, we may arrange for the light units 501 to carry out self test checks and transmit a pass/fail signal to the master control unit 502. For example, the light units 501 may check the battery, LEDs and circuit integrity. In this way the master control unit can determine if the lighting system meets the minimum equipment list (MEL) requirements for take-off.

Where the light source is a plurality of LEDs, the unit 501 may still be operational if some of the LEDs are not working. The LED check may therefore be used to determine the number of LEDs that are working and provide a signal to the master control unit 502 to indicate if the unit is operational. For example, the number of operational LEDs may be tested using a sub milli-second pulse, measuring the total current, and comparing this with a current for a permitted minimum number of operational LEDs. The LEDs may be pulsed so that the pulsing is not visible to the human eye to reduce power consumption. Pulsing may be carried out with a variable load factor to vary illumination levels and reduce power consumption.

Figure 4:
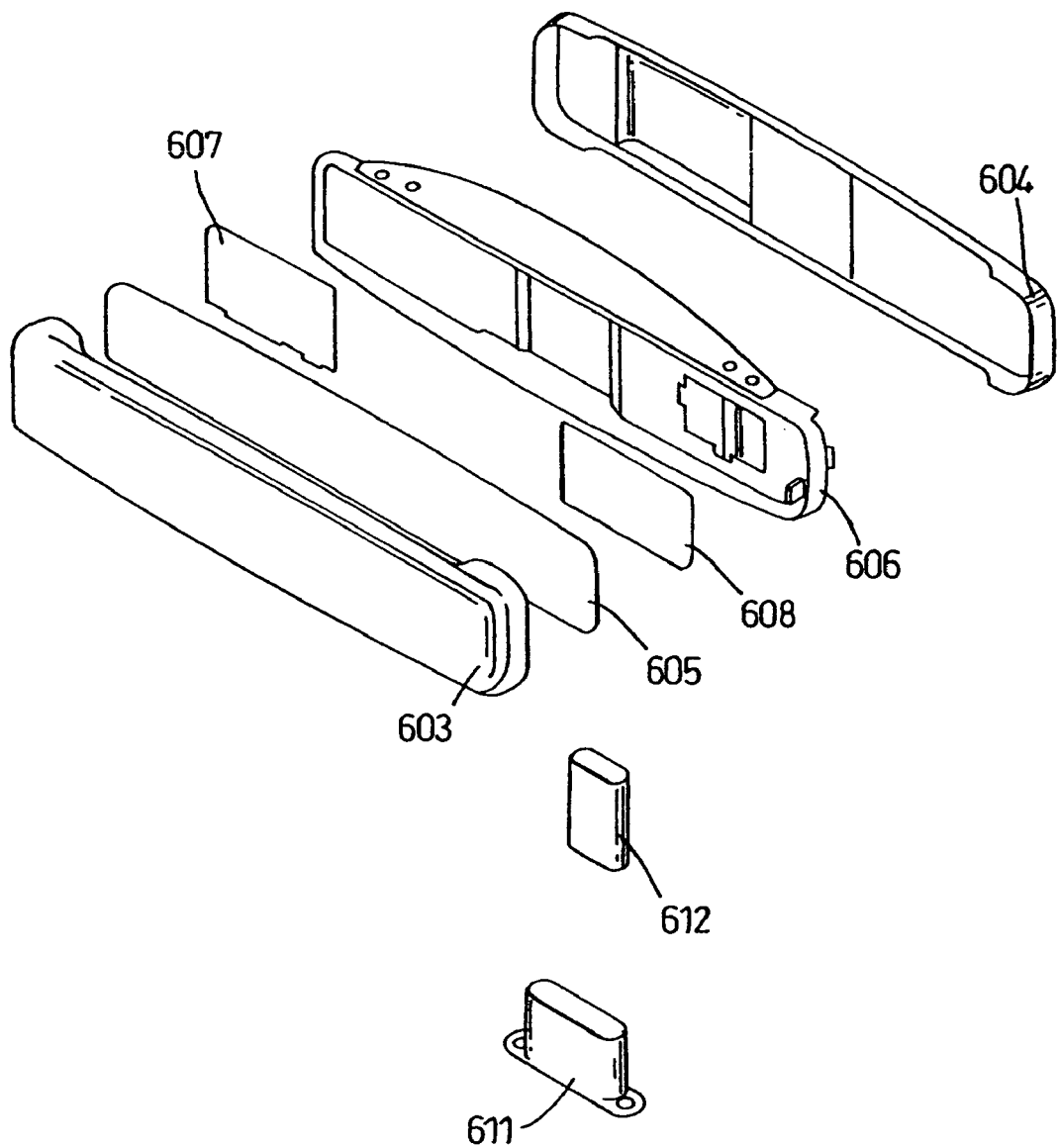
FIG. 4 is an exploded perspective view of component parts of the door exit sign shown in FIG. 2.
Figure 3:
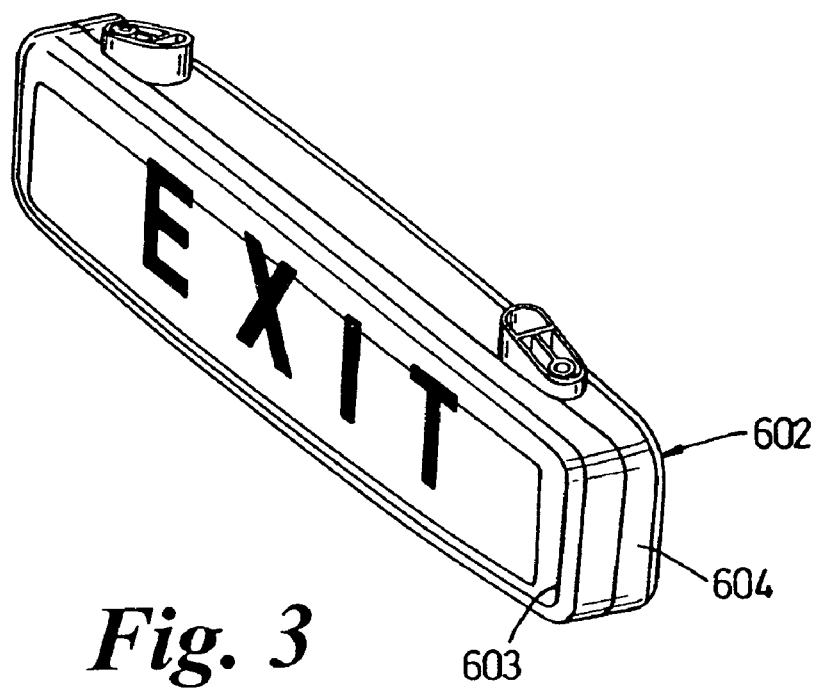
FIG. 3 is a perspective view of a door exit sign embodying the invention.
Figure 7:
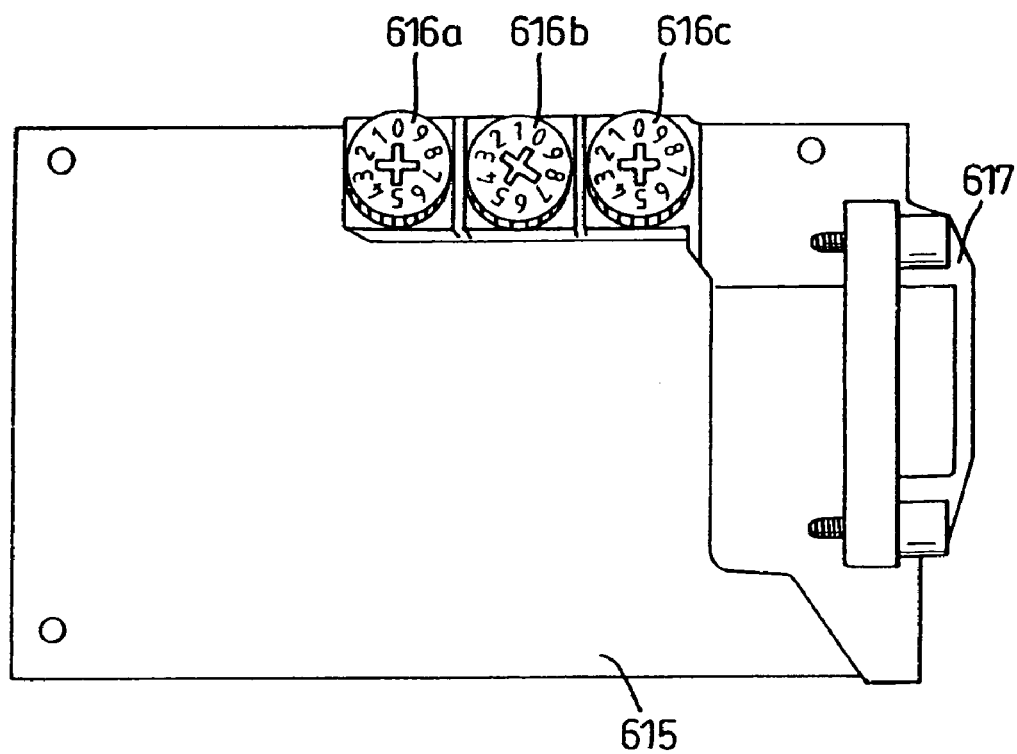
FIG. 7 shows parts of a control board of the membrane panel.
Figure 8:
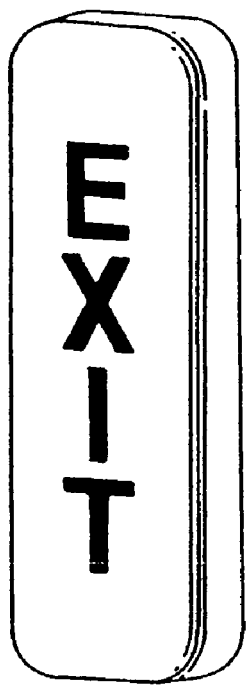
FIG. 8 is a perspective view of a vertical exit identifier (VEI) embodying the invention.

Referring now also to FIGS. 3 and 4 of the accompanying drawings, a door exit sign unit 601 is shown for mounting above any of the exits 513, 514, 515, 516 of the aircraft shown in FIG. 2. The sign unit 601 comprises a casing 602 of rectangular shape having a front panel 603 and a back panel 604 releasably secured together.

The front panel 603 is made of a clear or translucent plastics material such as polycarbonate and a light source in the form an LED flat panel diffuser 605 of rectangular shape is housed within the casing 602 between a rear surface of the front panel 603 and a front surface of a centre panel 606 located within the casing 602. The casing 602 is provided with a pair of brackets 602a,602b by means of which the sign unit 601 is mounted above the exit.

The LED flat panel diffuser 605 provides a uniform distribution of light across the front panel 603 and illuminates the word "exit" printed on the inner or rear surface of the front panel 603. The uniform distribution of light is maintained even if some of the LEDs are inoperable thereby avoiding the formation of black (unlit) spots as may occur with an array of LEDs where one or more LEDs has failed.

In this embodiment, the front panel 603 is clear or transparent and the word "exit" can be read both when the sign is lit and unlit. In a modification, the word "exit" may be printed on the outer or front surface of the front panel 603, for example where the panel is made of translucent material to allow the word to be seen both when the sign is lit and unlit.

As a result, the LED panel diffuser 605 can provide a satisfactory illumination even if the illumination level is slightly reduced due to some of the LEDs being inoperable. In addition, the LED panel diffuser consists of solid state components that are maintenance free for the life of the sign 601.

It will be understood that the information to be illuminated may be altered according to the position and function of the light unit. For example, where the light unit identifies an escape route along an aisle between rows of seats within the cabin to an exit, the information may be in the form of a direction indicator, for example an arrow, to show the direction to the nearest exit. The information may also be presented in different languages according to the flight route.

For example, the light unit may be provided with a set of interchangeable panels on which the information to be displayed is provided in different languages whereby the light unit can be adapted for a range of destinations by selection and fitment of the appropriate panel. In some applications, the light unit may simply provide illumination without any presenting any information.

In this embodiment, the LED panel diffuser has a thickness of approximately 3.5 mm which contributes to the casing 602 being of slim profile and reducing the space required to mount the sign unit 601. It will be understood, however, that the size and shape of the LED panel diffuser to suit the dimensions of the light unit in which it is employed. For example the LED panel is not limited to a rectangular shape and can be of any shape or profile and can pass light through a substrate up to 150 mm from the light source allowing a wide range of designs to be accommodated in a flexible manner.

The centre panel 606 carries the electronic circuitry in the form of two printed circuit boards 607,608 for controlling the operation of the LED panel diffuser 605 and the other functions of the sign unit 601 in response to broadcast signals from the master control unit 502 as described previously. The centre panel 606 also mounts a removable battery carrier 611. In this embodiment one battery 612 is provided but for some applications, for example where both sides of the sign unit 601 are illuminated such as a cross-aisle sign, two batteries may be provided.

The LED panel diffuser 605 can be easily assembled through a ten-way flat flexible cable directly to the printed circuit board 607 controlling illumination of the sign unit 601. The other printed circuit board 608 controls illumination of an external light source (not shown), such as an incandescent light, for illuminating an emergency chute or slide that is deployed to allow passengers to descend from the exit to the ground in a safe manner and aid rapid evacuation of the aircraft in an emergency.

Figure 5:
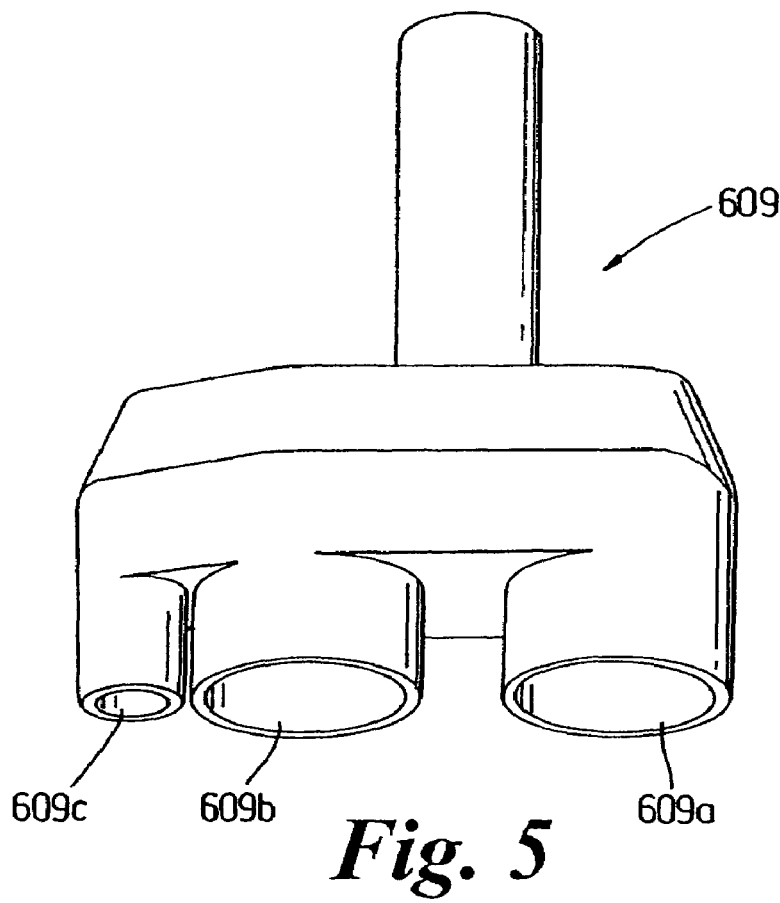
FIG. 5 is a perspective view, to an enlarged scale of an IRDA light guide.

In addition, the sign unit 601 is provided with an infra-red data (IRDA) interface in the form of a light guide 609 shown in more detail in FIG. 5 for local interrogation and/or programming of the sign unit 602. The light guide 609 is of small size, typically about 5 mm width and is shown greatly enlarged for convenience and clarity. The light guide 609 is accessible from the front of the sign unit 602 and is capable of passing infra-red signals back and forth to one or both printed circuit boards 607,608 via input and output ports 609a, 609b for receiving and transmitting signals for inputting/extracting data. The light guide 609 has a further, smaller output port 609c for emitting a flashing green light from the LED panel to provide a visual indication of the health of the unit 601 during testing.

The IRDA interface may be used on installation of the unit 602 to tell the unit 602 where it has been installed for transmitting this information to the master control unit 502 in response to an appropriate broadcast signal from the master control unit 502. For example, in response to a polling signal during initial registration of each light unit 501 with the master control unit 502 when the system is installed and/or in response to a test signal during routine maintenance testing of the system to enable the master control unit 502 to verify the number and position of units that are operable/inoperable. In this way, the master control unit 502 can determine if the system complies with the minimum equipment list (MEL) requirements for take-off and generate a pass/fail signal accordingly.

Figure 6:
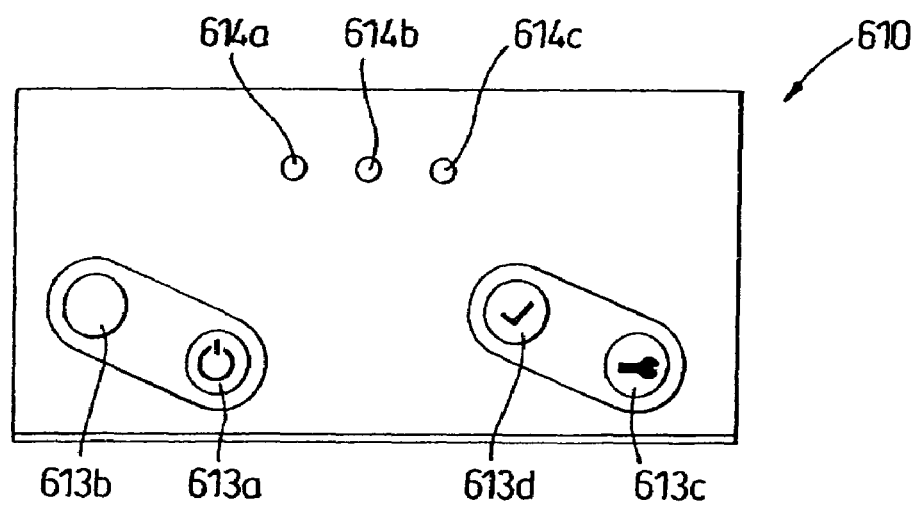
FIG. 6 is a perspective view of a membrane panel.

The "verify" cycle can be carried out at regular intervals, for example once a week, to provide an instant feedback to a membrane traffic light system employing a membrane panel 610 of the type shown in FIG. 6. As shown, the membrane panel 610 has four buttons 613a,b,c,d and three windows 614a,b,c. The buttons 613a,b,c,d operate switches (not shown) for controlling different functions of the panel. The windows 614a,b,c are provided with different coloured LEDs (not shown) of the traffic light system, for example red, amber and green LEDs.

The button 613a operates a power switch (not shown) that allows the master control unit 502 to be isolated from the cockpit switch (not shown) to reduce the risk of inadvertent switch-ons and unintentional draining of the battery. Button 613b may also operate a power switch so that both buttons 613a,b have to be pressed to connect the power. In this way, the risk of accidental switch-ons by pressing either button 613a,b alone is further reduced.

The button 613c is a registration button to configure the system when first installed or when a unit needs replacing. The membrane panel 610 is also provided with a control board 615 (FIG. 7) provided with three rotary dipswitches 616a,b,c, a serial interface port 617 and control circuitry (not shown).

The switches 616a,b,c are decimal switches that allow the total number of units in the system to be set on installation and the master control unit 502 checks that it hears from this number of units each time a check or other system function requiring all the units to respond is carried out. The switches 616a,b,c provide a fast and simple set-up that can accommodate changes in the total number of units, for example the addition or removal of units due to reconfiguration of the lay-out of the aircraft and/or extension of the system to other areas or uses.

The button 613d is a maintenance verification button that starts the verify sequence in response to which the traffic light system displays the overall system condition, for example red indicates the system does not meet the MEL requirements for take-off, amber indicates the MEL requirements are met but some of the units are not operable, and green indicates the MEL requirements are met and all units are operable.

This automated maintenance test procedure provides savings in time and money as well as enhancing reliability and safety by allowing any faulty units to be identified and interrogated centrally by the master control unit 502 or locally via the IRDA light guide 609 to determine the fault. The serial interface port 617 on the control board 615 can be plugged directly into a laptop/PDA for checking and/or interrogation of the system.

Although the invention has been described with reference to an exit sign to be placed over an exit door, it will be understood that the invention is not limited thereto and that any one or more of the features of the invention described herein can be used in any of the networked devices described in our aforementioned International patent application.

Figure 9:
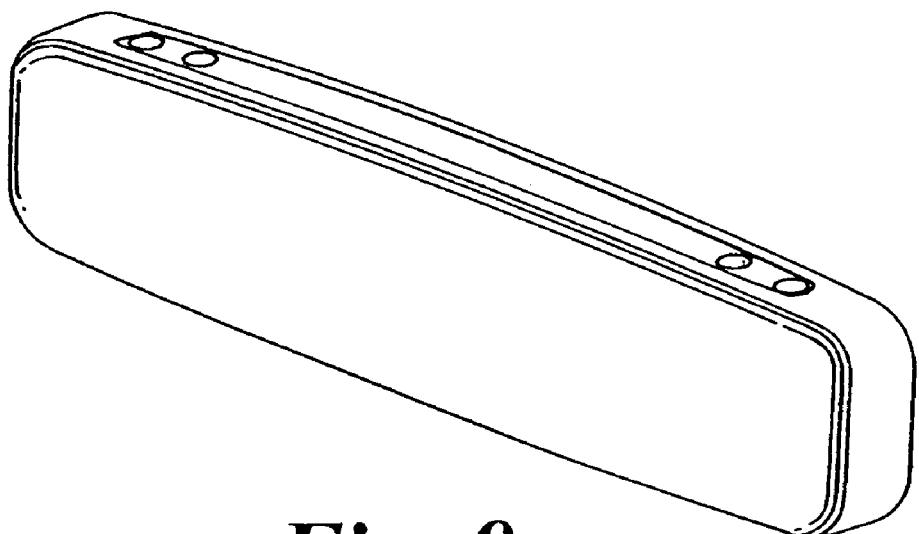
FIG. 9 is a perspective view of a cross-aisle sign embodying the invention.

For example, where the device includes a light source this may be used for illumination of vertical exit identifier (VEI) exit signs (FIG. 8) positioned on or both sides of an exit door, usually below 4 ft in height, or for illumination of large door exit signs, or other signs such as seat belt signs or cross-aisle signs (FIG. 9).

Figure 10:
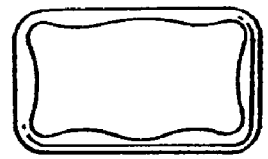
FIG. 10 is a perspective view of a downlight embodying the invention.

Alternatively or additionally, the devices may be used as low profile downlights (FIG. 10) for general cabin illumination, or as part of an illuminated guidance system for directing passengers to an exit such as a floor proximity system to identify a path or route along an aisle to an exit. Other applications and uses of illuminated devices will be apparent to those skilled in the art.

The system of networked devices with one or more master control units may be installed as original equipment during new build of aircraft or retro-fitted to replace an existing system, for example to replace a hard wired emergency lighting system powered by storage batteries.

For example, the master control unit may be designed to be easily retrofittable in place of the old rechargeable battery pack by means of an appropriate connector fitted to the master control unit so that it can be push fitted in place. The light units may also be designed to fit directly into the same position in place of the existing light units making the units very easy to retrofit.

The slim profile of the light units also enables installation for new build directly on top of interior panels without any cutting of the panels or routing of wires required to recess fit existing hard wired light units.

We may also arrange the over door exit sign to provide the power (a battery such as a 6 cell lithium sulphur dioxide battery) and wireless control for the exterior light unit(s) used to illuminate the escape chute for passengers to slide down from the exit to the ground when escaping the aircraft.

For this, the over door exit sign holds the main printed circuit board and the 6 cell battery to power, control and test the exterior light unit(s). The exterior light unit(s) may employ incandescent bulbs to provide the required level of illumination for the escape chute.

Alternatively or additionally, we may include some form of illumination within the chute that is operable when the chute is deployed such as described in our International patent application published under No. WO 02/074620 the contents of which are incorporated herein by reference.

We claim:

1. A system for a vehicle, comprising a plurality of networked communication devices arranged to communicate with a master controller wherein each device is arranged to cycle between an operable (awake) condition and an inoperable (sleep) condition in which the wake-up time is approximately 1 millisecond or less, and wherein one or more of said devices is provided with a light source employing LEDs and is operable to provide a light source check using a sub millisecond pulse, to measure the total current of the LEDs, and comparing this total current with a current for a permitted minimum number of operational LEDs to determine the number of LEDs that are operational, and provide a signal to the master controller to indicate if the light source is operational.

2. A system according to claim 1 wherein the devices communicate with the master controller using spread spectrum communication centred on a single frequency.

3. A system according to claim 1 wherein the light source comprises an LED flat panel diffuser.

4. A system according to claim 1 wherein each device further includes one or more of a battery life check, and circuit integrity check.

5. A system according to claim 1 wherein, in use, power consumption is reduced by pulsing at least one of said LEDs.

6. A system according to claim 5 wherein at least one of said LEDs is pulsed at a frequency so that no pulsing is visible to the human eye.

7. A system according to claim 5 wherein the light source is pulsed with a variable load factor.

8. A system according to claim 5 wherein the light source is operable at full brightness for an initial period after switching on and then gradually reduce the brightness to a pre-determined minimum.

9. A system according to claim 1 wherein, in use, at least one of said LEDs is capable of providing a variable illumination level.

10. A system according to claim 1 wherein one or more devices is provided with an infra-red data (IRDA) interface for local communication with the device.

* * * * *